United States Patent Office 3,489,825
Patented Jan. 13, 1970

3,489,825
PHOSPHONYL CHLORIDES, THIOPHOSPHONYL CHLORIDES AND PROCESS OF MAKING SAME
Paul C. Aichenegg, Prairie Village, Kans., assignor to Chemagro Corporation, Kansas City, Mo., a corporation of New York
No Drawing. Filed Mar. 6, 1967, Ser. No. 620,664
Int. Cl. C07f *9/42, 9/40, 9/44*
U.S. Cl. 260—957                                    23 Claims

ABSTRACT OF THE DISCLOSURE

Compounds are prepared having the formula

where $R_1$ is trichloroethyl or dichlorovinyl, $R_2$ is lower alkyl or phenyl and X is oxygen or sulfur. The trichloroethylthio (or dichlorovinylthio) alkyl (or phenyl) phosphonyl chlorides are prepared by reacting trichloroethyl (or dichlorovinyl) sulfenyl chloride with alkyl (or phenyl) phosphonyl dichloride and sulfur dioxide, preferably in carbon tetrachloride as a solvent. The trichloroethylthio (or dichlorovinylthio) alkyl (or phenyl) thiophosphonyl chlorides are prepared by reacting trichloroethyl (or dichlorovinyl) sulfenyl chloride with alkyl (or phenyl) phosphonyl dichloride and hydrogen sulfide, preferably in carbon tetrachloride as a solvent. The compounds are useful as nematocides, fungicides, insecticides and bactericides, and also as intermediates in the preparation of esters, thioesters and amidates.

---

The present invention relates to the preparation of novel phosphonyl chlorides and thiophosphonyl chlorides.

It is an object of the present invention to prepare novel phosphonyl chlorides.

Another object of the invention is to prepare novel thiophosphonyl chlorides.

A further object is to develop a new procedure for preparing thiophosphonyl chlorides.

An additional object is to prepare phosphonyl chlorides and thiophosphonyl chlorides as intermediates having a high order of reactivity toward nucleophiles and thereby making accessible many new esters, thioesters and amidates.

Yet another object is to prepare phosphonyl chlorides and thiophosphonyl chlorides which are useful in agricultural, chemical and animal health fields.

A still further object is to prepare phosphonyl chlorides and thiophosphonyl chlorides useful in preparing biologically active esters, thioesters and amidates.

Still further objects and the entire scope of applicability of the present will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphonyl chlorides and thiophosphonyl chlorides having the formula

where $R_1$ is trichloroethyl or dichlorovinyl, $R_2$ is lower alkyl, preferably methyl or ethyl, or phenyl and X is oxygen or sulfur.

The compounds of the present invention are useful as nematocides, fungicides, insecticides and bactericides. Thus they can be used to kill Panagrellus and Rhabditis spp. or they can be used to kill Pythium spp. in soil infested with this organism.

They are particularly useful, however, as intermediates in preparing new esters, thioesters and amidates which are more stable than the phosphonyl chlorides and thiophosphonyl chlorides themselves. The esters, thioesters and amidates also are useful as nematocides, fungicides, insecticides and bactericides and can be used to kill Panagrellus and Rhabditis spp. and Pythium spp. for example. Specific examples of esters, thioesters and amidates are set forth infra as derivatives of the corresponding phosphonyl chlorides and thiophosphonyl chlorides.

Examples of compounds within the present invention are S-2,2,2-trichloroethyl methyl phosphonyl chloride, S-2,2,2-trichloroethyl ethyl phosphonyl chloride, S-2,2,2-trichloroethyl propyl phosphonyl chloride, S-2,2,2-trichloroethyl butyl phosphonyl chloride, S-2,2,2-trichloroethyl isobutyl phosphonyl chloride, S-1,2,2-trichloroethyl methyl phosphonyl chloride, S-1,2,2-trichloroethyl ethyl phosphonyl chloride, S-2,2,2-trichloroethyl phenyl phosphonyl chloride, S-1,2,2-trichloroethyl phenyl phosphonyl chloride, S-2,2-dichlorovinyl methyl phosphonyl chloride, S-2,2-dichlorovinyl ethyl phosphonyl chloride, S-2,2-dichlorovinyl propyl phosphonyl chloride, S-2,2-dichlorovinyl isopropyl phosphonyl chloride, S-2,2-dichlorovinyl butyl phosphonyl chloride, S-2,2-dichlorovinyl phenyl phosphonyl chloride, S-2,2,2-trichloroethyl methyl thiophosphonyl chloride, S-2,2,2-trichloroethyl ethyl thiophosphonyl chloride, S-2,2,2-trichloroethyl propyl thiophosphonyl chloride, S-2,2,2-trichloroethyl butyl thiophosphonyl chloride, S-2,2,2-trichloroethyl phenyl thiophosphonyl chloride, S-1,2,2-trichloroethyl methyl thiophosphonyl chloride, S-1,2,2-trichloroethyl ethyl thiophosphonyl chloride, S-1,2,2-trichloroethyl thiophosphonyl chloride, S-2,2-dichlorovinyl methyl thiophosphonyl chloride, S-2,2-dichlorovinyl ethyl thiophosphonyl chloride, S-2,2-dichlorovinyl propyl thiophosphonyl chloride, S-2,2-dichlorovinyl butyl thiophosphonyl chloride.

The phosphonyl chlorides and thiophosphonyl chlorides of the present invention are prepared according to the following procedures.

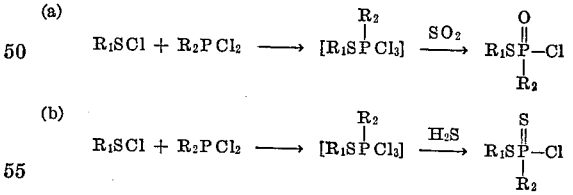

For convenience a solvent such as carbon tetrachloride is employed. To avoid losses due to hydrolysis or other side reactions substantially anhydrous conditions are normally employed. In general more impurities accompany the product when $R_1$ is 1,2,2-trichloroethyl rather than 2,2,2-trichloroethyl or 2,2-dichlorovinyl.

The reaction employing hydrogen sulfide has not previously been reported for making thiophosphonyl chlorides while the method employing sulfur dioxide is a well known procedure for making phosphonyl chlorides.

Since hydrogen sulfide has little solubility in carbon tetrachloride and the reaction of two of the chlorines of the phosphonium complex $$R_1SPCl_3$$
$$|$$
$$R_2$$

with H₂S is rapid to give

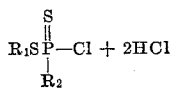

little or no further reaction of the

compound with H₂S gas occurs.

The conversions take place rapidly and good yields of the product are obtained.

The general method is to introduce anhydrous hydrogen sulfide gas into the moderately agitated suspension of the phosphonium complex in carbon tetrachloride, keeping the temperature between 10 and 25° C. with outside cooling (ice-water bath) and allowing for two to three times volume expansion due to frothing of the solution during treatment, since 2 moles of HCl gas are formed for each mole of H₂S gas used. The treatment is finished when the HCl evolution ceases.

The compounds of the invention are colorless to yellow distillable oils. Only S - 2,2,2 - trichloroethyl ethyl phosphonyl chloride solidified at moderately low temperatures.

As starting sulfenyl chlorides there can be used 2,2,2-trichloroethyl sulfenyl chloride, 1,2,2-trichloroethyl sulfenyl chloride and 2,2-dichlorovinyl sulfenyl chloride.

As starting phosphonous dichlorides there can be used methane phosphonous dichloride ($CH_3PCl_2$), ethane phosphonous dichloride, propane phosphonous dichloride, butane phosphonous dichloride, phenyl dichlorophosphine and the like.

Unless otherwise stated all parts and percentages are by weight.

EXAMPLE 1

30 grams (0.25 mole plus a slight excess) of methane phosphonous dichloride were diluted under a nitrogen atmosphere with 100 ml. of dry carbon tetrachloride and 50 grams (0.25 mole) of 2,2,2-trichloroethyl sulfenyl chloride were added dropwise with stirring while allowing the temperature to rise to 58° C. Additional stirring for one hour at room temperature resulted in the formation of a suspension of a white solid in a pale yellow liquid. A rapid stream of $SO_2$ gas was then introduced until the reaction was complete. (The temperature was allowed to reach 55° C. and the gas introduction was continued until the temperature of the reaction mixture returned to 25° C.)

Standing overnight at room temperature and fractionation in a vacuum gave 50 grams (76% yield) of S-2,2,2-trichloroethyl methyl phosphonyl chloride (Compound CP 12) as the main fraction, B.P.$_{0.1-0.2}$ 110–115° C., $n_D^{25}$ 1.5535, redistillation gave 42 grams (64% yield) of CP 12 as an almost colorless oil, B.P.$_{0.08}$ 94° C., $n_D^{25}$ 1.5525; Cl 54.3% (theory 54.2%).

EXAMPLE 2

To 35 grams (0.173 mole plus a large excess because the starting material was only 65% pure) of ethyl phosphonous dichloride ($CH_3CH_2PCl_2$) in 100 ml. of carbon tetrachloride there were added 34.7 grams (0.173 mole) of 2,2,2 - trichloroethyl sulfenyl chloride at 5–10° C. (cooling with an ice-water bath). After one additional hour's stirring at room temperature, a rapid $SO_2$ stream was introduced until the exothermic reaction subsided (the temperature rose to 45–50° C. and then dropped back to room temperature). Stripping and distilling in high vacuum gave 41.5 grams (87% yield) of S-2,2,2-trichloroethyl ethyl phosphonyl chloride (Compound CP 22) as a colorless oil, B.P.$_{0.08}$ 108–114° C., $n_D^{21}$ 1.5465.

EXAMPLE 3

To 90 grams (0.4 mole plus a 20% excess to allow for P=O impurities in the starting material) of phenyldichlorophosphine ($PhPCl_2$) there were added dropwise with stirring 80 grams (0.4 mole) of 2,2,2-trichloroethyl sulfenyl chloride and the temperature allowed to rise to 50–60° C. This temperature was maintained throughout the addition period. The reaction was instantaneous. While still warm and in order to avoid crystallization of the phosphonium salt, 50 ml. of dry tetrahydrofuran were added. After standing at room temperature for 1 further hour a rapid stream of dry $SO_2$ was introduced until the initial exothermic reaction (up to 45° C.) subsided and the mixture attained room temperature (25° C.) again. A 30 minute sulfur dioxide introduction period was found adequate.

Stripping of the mixture obtained in high vacuum gave 120 grams (93% yield) of crude S-2,2,2-trichloroethyl phenyl phosphonyl chloride (Compound CP 8) as a clear oil of greenish color. Pure CP 8 in an amount of 81 grams (68% yield) was obtained as a colorless oil upon distillation in high vacuum, B.P.$_{0.05}$ 140–150° C., $n_D^{25}$ 1.5945; Cl 43.3% (theory 43.8%); P 9.4% (theory 9.6%); S 9.5% (theory 9.9%).

EXAMPLE 4

To a solution of 38 grams (0.325 mole plus 27% excess) of methyl phosphonous dichloride ($MePCl_2$) in 100 ml. of dry carbon tetrachloride there were added 50 grams of 2,2,2-trichloroethyl sulfenyl chloride dropwise with stirring and cooling (ice-water bath) at 20–25° C. Finally a faintly pink precipitate suspended in carbon tetrachloride was formed. (Completion of the reaction was checked with KI-starch indicator.)

A total of 15 grams (0.25 mole plus excess) of dry $H_2S$ gas were then introduced at a moderate rate. After a 2–5 minute induction period the reaction started smoothly under heavy evolution of HCl gas at 25–35° C. The reaction was complete when the temperature returned back to 25° C. The $H_2S$-saturated solution was allowed to stand over the weekend and the resulting water clear solution stripped in high vacuum. A nearly quantitative yield of crude S-2,2,2-trichloroethyl methyl thiophosphonyl chloride (Compound C 16) was obtained which upon distillation in high vacuum gave 50 grams (72% yield) of pure CP 16 as a colorless oil, B.P.$_{0.08}$ 100–5° C., $n_D^{21}$ 1.6025.

EXAMPLE 5

26.2 grams (0.131 mole) of 2,2,2-trichloroethyl sulfenyl chloride were added dropwise with stirring and cooling at 0–10° C. to 26.5 grams (0.131 mole of 65% pure) ethyl phosphonous dichloride in 100 ml. of dry carbon tetrachloride. The reaction was instantaneous.

A total of 10 grams (somewhat more than twice the required amount) of dry $H_2S$ gas were then introduced at 5–10° C. with occasional cooling. Standing of the $H_2S$-saturated solution for a further 2 hours and high vacuum stripping gave a quantitative yield of crude S-2,2,2-trichloroethyl ethyl thiophosphonyl chloride (Compound CP 32) which in turn furnished 30 grams (79% yield) of pure CP 32 as an almost colorless oil on high vacuum distillation, B.P.$_{0.07}$ 102–6° C., $n_D^{22}$ 1.5918.

EXAMPLE 6

40 grams (0.2 mole) of 2,2,2-trichloroethyl sulfenyl chloride were added to a solution of 45 grams (0.2 mole plus a 10% excess) of phenyl dichlorophosphine in 150 ml. of dry carbon tetrachloride at a temperature below 45° C. Toward the end of the addition the resulting mixture was orange. Standing for 1 further hour, however, completed the reaction.

$H_2S$ treatment as set forth in Example 5 gave after distilling the stripped residue in high vacuum 51 grams (74% yield) of S-2,2,2-trichloroethyl phenyl thiophosphonyl chloride (Compound CP 9) as a colorless oil, B.P.$_{0.07}$ 156–160° C., $n_D^{23}$ 1.6400.

EXAMPLE 7

55 grams (0.337 mole) of 2,2-dichlorovinyl sulfenyl chloride were added dropwise with stirring to a solution of 55 grams (0.470 mole, this was an excess of 28% over the calculated amount) of methyl phosphonous dichloride in 100 ml. of carbon tetrachloride at 10–15° C. (cooling with an ice-water bath) under a blanket of nitrogen. The resulting suspension of a white precipitate in the faintly yellow carbon tetrachloride solution was then allowed to stir at room temperature (25° C.) for one further hour and finally treated with a rapid SO$_2$ gas stream. The reaction temperature climbed freely to 45° C. and the SO$_2$ introduction was continued until the reaction temperature was back to 25° C. Direct stripping of the solution gave a quantitative yield of crude S-2,2-dichlorovinyl methyl phosphonyl chloride (Compound CP 14) which in turn furnished 56 grams (74% yield) of pure CP 14 as a yellow oil, B.P.$_{0.08}$ 92–5° C., $n_D^{21}$ 1.5730.

EXAMPLE 8

To a solution of 26.2 grams (0.2 mole) of ethyl phosphonous dichloride in 100 ml. of dry carbon tetrachloride there were added 33.7 grams (0.2 mole) of 2,2-dichlorovinyl sulfenyl chloride diluted with 20 ml. of carbon tetrachloride at 10–15° C. (ice-water bath) with stirring. When addition was complete a white precipitate was formed suspended in an orange solution. As there was present a considerable amount of unreacted sulfenyl chloride (as shown by a KI-starch check) there was added dropwise more of the ethyl phosphonous dichloride until all of the sulfenyl chloride was converted. For completion (negative KI-starch check) in all 14 additional grams the ethyl phosphonyl dichloride had to be added. The ensuing mixture turned very faintly yellow. The additional quantity of EtPCl$_2$ required indicated that the starting reagent used contained 30–35% PCl$_3$. Since PCl$_3$ under the conditions employed is non-reactive to SO$_2$, the total mixture was treated with SO$_2$ gas, the temperature allowed to rise of its own accord to 40–45° C. and the treatment continued until the temperature fell back to room temperature of its own accord. High vacuum distillation gave 38 grams (79% yield) of pure S-2,2-dichlorovinyl ethyl phosphonyl chloride (Compound CP 23) as an almost colorless oil, B.P.$_{0.08}$ 100–102° C., $n_D^{25}$ 1.5609.

EXAMPLE 9

33 grams (0.2 mole) of freshly "flash" distilled 2,2-dichlorovinyl sulfenyl chloride were added dropwise at 15–20° C. (with occasional cooling) to 43 grams (0.2 mole plus about 15% excess) of phenyl dichlorophosphine. Direct saturation of the resulting suspension with SO$_2$ gas while allowing the temperatures to rise to 40° C. and fall back to 25° C. was applied for conversion to the P=O compound. High vacuum distillation gave 30 grams (52% yield) of S-2,2-dichlorovinyl phenyl phosphonyl chloride (Compound CP 10) as a light yellow oil, B.P.$_{0.07}$ 135–140° C. $n_D^{25}$ 1.6147.

EXAMPLE 10

40 grams (0.2 mole plus 40% excess to allow for contamination in commercial methyl dichlorophosphine) of methyl dichlorophosphine were added into 100 ml. of dry carbon tetrachloride under a blanket of dry nitrogen and 32.7 grams (0.2 mole) of 2,2-dichlorovinyl sulfenyl chloride in 30 ml. of carbon tetrachloride were added dropwise with stirring at 10–15° C. (cooling with ice-water) in an atmosphere of dry nitrogen. The resulting mixture of a white precipitate in a very pale yellow carbon tetrachloride solution was allowed to stand with stirring at room temperature (25° C.) for one hour.

The conversion to the thiono compound was carried out applying direct introduction of a dry H$_2$S gas stream of moderate velocity. A total of 10 grams of H$_2$S gas was used and the temperature of the moderately agitated solution was allowed to slowly rise to 40–50° C. One further hour stirring at room temperature, stripping and distillation in high vacuum gave a total of 40 grams (80% yield) of S-2,2-dichlorovinyl methyl thiophosphonyl chloride (Compound CP 15) as a colorless liquid, B.P.$_{0.07}$ 84–6° C., $n_D^{22}$ 1.6274.

EXAMPLE 11

To a solution of 40 grams (0.2 mole plus excess to allow for the 60–65% purity of the starting material, primary contaminant being PCl$_3$) of ethyl phosphonous dichloride in 100 ml. of dry carbon tetrachloride there were added dropwise with stirring and cooling at 10–15° C. (ice-water bath) 33.7 grams (0.2 mole) of 2,2-dichlorovinyl sulfenyl chloride. At the end of the addition a white precipitate suspended in a very pale yellow carbon tetrachloride solution ensued. In order to remove all of the volatiles (particularly the PCl$_3$ impurity) the whole mixture was subjected to high vacuum stripping for 30 minutes at 50–60° C. in a rotating evaporator. The residue obtained was diluted to its original volume with fresh carbon tetrachloride and H$_2$S gas was introduced. A total of about 10 grams (60–70% excess) of H$_2$S gas were used and the temperature was kept at 10–15° C. (ice-water bath) in order to moderate the reaction. Toward the end of the H$_2$S introduction the HCl evolution was practically at an end.

Stripping in high vacuum gave 50 grams (98% yield) of crude S-2,2-dichlorovinyl ethyl thiophosphonyl chloride (Compound CP 33) which in turn yielded 35 grams (70% yield) of pure CP 33 as a colorless oil, B.P.$_{0.09}$ 99–103° C., $n_D^{25}$ 1.6118.

EXAMPLE 12

33 grams (0.2 mole) of 2,2-dichlorovinyl sulfenyl chloride were reacted with a total of 53 grams (0.2 mole plus a large excess to account for impurities) of phenyl dichlorophosphine in the same manner as described in Example 9 to yield a suspension of the phosphonium complex in carbon tetrachloride. The mixture was then treated with H$_2$S gas at 25° C. (with cooling) in the manner set forth in Example 11. High vacuum distillation gave 28 grams (46% yield) of S-2,2-dichlorovinyl phenyl thiophosphonyl chloride (Compound CP 11) as a yellow oil, B.P.$_{0.08}$ 144–54° C., $n_D^{22}$ 1.6627.

As previously indicated the compounds of the present invention can be used to prepare esters, thioesters and amidates.

Thus the compounds of the present invention can be reacted with alcohols such as methyl alcohol, ethyl alcohol, propyl alcohol, isopropyl alcohol, butyl alcohol, octyl alcohol, sec. octyl alcohol, isooctyl alcohol, amyl alcohol, 2,2,2-trichloroethyl alcohol, ethylene chlorohydrin, propylene chlorohydrin, trimethylene chlorohydrin, 1,3-dichloro-2-propanol, ethylene bromohydrin, allyl alcohol or phenols (preferably in the form of their sodium salts), e.g. phenol per se, p-cresol, m-cresol, o-cresol, p-ethyl phenol, 2-chlorophenol, 4-chlorophenol, 2,4-dichlorophenol, p-t-butyl phenol, p-octyl phenol, 2-methyl-4-chlorophenol, 2,4,5-trichlorophenol, p-butylphenol, or mercaptans, e.g. methyl mercaptan, isopropyl mercaptan, ethyl mercaptan, propyl mercaptan, butyl mercaptan, sec. butyl mercaptan, thiophenol, p-t-butyl thiophenol, amyl mercaptan, octyl mercaptan, 2,4,5-trichlorothiophenol, 2-methyl-4-chlorothiophenol; or primary or secondary amines, e.g. methyl amine, ethyl amine, isopropyl amine, propyl amine, butyl amine, isobutyl amine, amyl amine, hexyl amine, cyclohexyl amine, piperidine, pyrrolidine, octyl amine, dimethyl amine, diethyl amine, dipropyl amine, dibutyl amine, diamyl amine, diisopropyl amine, aziridine (ethylene imine), dioctyl amine, diisobutyl amine, aniline, N-methylaniline, N-ethyl aniline, m-chloro aniline, α-naphthyl amine, β-naphthyl amine, p-bromoaniline, N-butyl aniline, o-toluidine, p-toluidine, p-chloroaniline, o-chloroaniline.

Such esters, thioesters and amidates have the formula

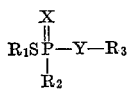

or the formula

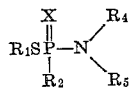

where $R_1$, $R_2$ and $X$ are as previously defined, $Y$ is oxygen or sulfur, $R_3$ is alkyl, aryl, haloalkyl or haloaryl, $R_4$ is alkyl, aryl or haloaryl and $R_5$ is hydrogen or $R_4$.

Specific examples of the of the preparation of such derivatives are set forth below.

EXAMPLE 13

6.1 grams (0.023 mole) of CP 12 were dissolved in 60 ml. of Skellysolve B-benzene (1:5 by volume). 38 grams (0.023 mole) of 2,4-dichlorophenol in 20 ml. of benzene were added and the reaction was effected by dropwise addition of 2.3 grams (0.023 mole) of triethylamine in 10 ml. of Skellysolve B with stirring and cooling at a temperature not to exceed 35° C. 1.5 hours warming at 50° C., cooling, washing in succession with dilute hydrochloric acid, dilute aqueous sodium bicarbonate and water, drying over anhydrous magnesium sulfate and high vacuum stripping gave 8.8 grams (98% yield) of crude S-2,2,2-trichloroethyl-O-2,4-dichlorophenyl methyl phosphonate (Compound 6702) as a buff colored solid which after a short wash with Skellysolve B gave white crystals, M.P. 86° C.; Cl 44.7% (theory 45.6%); S 8.3% (theory 8.25%); P 7.9% (theory 7.9%).

Skellysolve B is an aliphatic hydrocarbon solvent boiling in the hexane range.

EXAMPLE 14

11.05 grams (0.04 mole) of CP 22 were diluted with 100 ml. of dry chloroform and 4.8 grams (0.08) mole of monoisopropyl amine in 10 ml. of chloroform were added dropwise with stirring and cooling at 5–10° C. After completed addition the whole mixture was allowed to stir at room temperature overnight. Washing with dilute HCl, dilute NaHCO$_3$ and water, drying over anhydrous MgSO$_4$ and stripping off of the chloroform gave 11.5 grams (96.5% yield) of S-2,2,2-trichloroethyl ethyl phosphon-monoisopropyl amidate (Compound 7835) as a light amber viscous oil, $n_D^{23}$ 1.5213.

EXAMPLE 15

9.7 grams (0.03 mole) of CP 8 in 10 ml. of Skellysolve B were added to 3 grams (i.e. a large excess) of ethyl mercaptan in 50 ml. of Skellysolve B. 3.0 grams of triethylamine (0.03 mole) in 10 ml. of Skellysolve B were then added dropwise with stirring at below 35° C. over a period of 20 minutes. Stirring at room temperature for 2 further hours, washing the mixture with dilute HCl, dilute NaHCO$_3$ and water, drying of the organic layer over MgSO$_4$ and stripping gave 10.0 grams (95% yield) of S-2,2,2-trichloroethyl-S-ethyl phosphonate (Compound 6645) as an almost colorless and odorless viscous oil, $n_D^{20}$ 1.5992; Cl 30.2% (theory 30.5%), P 8.7% (theory 8.9%).

EXAMPLE 16

11.1 grams (0.04 mole) of CP 16 were dissolved in 100 ml. of chloroform and 4.8 grams (0.08 mole) of monoisopropyl amine in 10 ml. of chloroform were added dropwise with stirring at 5–10° C. with cooling. The mixture was allowed to warm to room temperature and stand overnight. Washing of the chloroform solution with dilute HCl, dilute NaHCO$_3$ and water, drying over anhydrous MgSO$_4$ and stripping of the organic solution gave 11.5 grams (96% yield) of S-2,2,2-trichloroethyl methyl thiophosphon-monoisopropyl amidate (Compound 7836) as an almost colorless, very viscous oil, $n_D^{23}$ 1.5747.

EXAMPLE 17

11.7 grams (0.04 mole) of CP 32 were dissolved in 100 ml. of chloroform and a solution of 4.8 grams of monoisopropyl amine in 10 ml. of chloroform was added dropwise with stirring at 5–10° C. with occasional cooling. Additional slow stirring overnight at room temperature, washing of the resulting mixture in succession with dilute HCl, dilute NaHCO$_3$ and water, drying over anhydrous magnesium sulfate and stripping gave a 90% yield of S-2,2,2-trichloroethyl ethyl thiophosphon monoisopropyl amidate as a viscous, colorless oil, $n_D^{24}$ 1.5684.

EXAMPLE 18

10.2 grams of CP 9 (0.03 mole) were diluted with 50 ml. of benzene and 2 grams (a slight excess) of ethyl alcohol were added. 3 grams (0.03 mole) of triethyl amine in 10 ml. of benzene were added with stirring and cooling at room temperature in order to complete the reaction. Standing overnight and working up by washing with dilute HCl, dilute NaHCO$_3$ and water, drying over MgSO$_4$ and high vacuum stripping gave 9.7 grams (93% yield) of S-2,2,2-trichloroethyl-O-ethyl phenyl triophosphonate (Compound 7823) as a yellow oil, $n_D^{23}$ 1.6030.

EXAMPLE 19

13.55 grams (0.06 mole) of CP 14 dissolved in 100 ml. of petroleum ether were reacted with 7.2 grams (0.12 mole) of monoisopropyl amine at room temperature. (The temperature did not exceed 30° C.). 50 ml. of benzene were added to make the product soluble in the organic layer. Washing with dilute HCl, dilute NaHCO$_3$ and water, drying over MgSO$_4$ and stripping gave 10 grams (67% yield) of S-2,2-dichlorovinyl methyl phosphon monoisopropyl amidate (Compound 7587) as an amber, viscous oil, $n_D^{22}$ 1.5486.

EXAMPLE 20

To 10 grams (0.042 mole) of CP 23 in 50 ml. of dry chloroform there were added 3 grams (0.042 mole+0.5 gram excess) of ethyl mercaptan at 0–5° C. followed by dropwise addition of 4.25 grams (0.042 mole) of triethylamine in 20 ml. of chloroform with cooling and stirring. Stirring at room temperature for 3 hours, washing with dilute HCl, dilute NaHCO$_3$ and water and drying over MgSO$_4$ gave after high vacuum stirpping 9.9 grams (89% yield) of S-2,2-dichlorovinyl S-ethyl ethyl phosphonate (Compound 7502) as a light viscous oil, $n_D^{23}$ 1.5756.

EXAMPLE 21

To 8.61 grams (0.03 mole) of CP 10 in 100 ml. of petroleum ether stirred and cooled to 10–15° C. there were added 3.0 grams (about a 10% excess) of dimethylamine at a moderate rate at a temperature of not over 15° C. Finally the whole mixture was stirred for 30 minutes at room temperature. Addition of 50 ml. of benzene to dissolve all of the product formed, washing with dilute HCl, dilute NaHCO$_3$ and water, drying over MgSO$_4$ and stripping of the organic layer gave 7.5 grams (85% yield) of S-2,2-dichlorovinyl phenyl phosphono N,N-dimethyl amidate (Compound 6707) as a brown oil, $n_D^{23}$ 1.5942.

EXAMPLE 22

To 9.5 grams (0.039 mole) of CP 15 in 100 ml. of chloroform there were added with stirring and cooling at 15–20° C. a solution of 4.64 grams of monoisopropyl amine in 10 ml. of chloroform. Stirring at room temperature for 2 more hours, washing with dilute HCl, dilute NaHCO$_3$ and water, drying over anhydrous MgSO$_4$ and high vacuum stripping gave 9.8 grams (94% yield) of S - 2,2 - dichlorovinyl methyl thiophosphon - N - monoisopropyl amidate (Compound 7590) as an amber oil, $n_D^{22}$ 1.5882, Cl 27.2% (theory 26.8%), P 11.4% (theory 11.7%), S 23.3% (theory 24.2%).

EXAMPLE 23

9.5 grams (0.037 mole) of CP 33 in 100 ml. of chloroform was reacted with 4.4 grams of monoisopropyl amine (an excess) in 10 ml. of chloroform by dropwise addition of the amine solution with stirring at 5–10° C. with cooling. The mixture was warmed for 30 further minutes at 45–50° C. Washing when cooled to room temperature with dilute HCl, dilute NaHCO₃ and water, drying over MgSO₄ and high vacuum stripping gave 10 grams (97% yield) of S-2,2-dichlorovinyl ethyl thiophosphon-N-monoisopropyl amidate (Compound 7592) as an amber oil, $n_D^{24}$ 1.5807.

EXAMPLE 24

To 12 grams (0.039 mole) of CP 11 in 100 ml. of carbon tetrachloride there were added 3 grams (an excess) of ethyl mercaptan followed by dropwise addition with stirring and cooling of 4 grams (the calculated amount) of triethylamine at 25–30° C. Further stirring at room temperature overnight, washing with dilute HCl, dilute NaCHO₃ and water, drying over MgSO₄ and stripping gave 11 grams (85% yield) of S-2,2-dichlorovinyl-S-ethyl-phenyl-thiophosphonate (Compound 7830) as a light yellow oil, $n_D^{22}$ 1.6634.

In the following tables illustrating nematocidal activity the compounds tested were formulated as wettable powders consisting of 50% of the compound being tested, 46% of ultra fine silica, 2% sodium lignin sulfonate and 2% Pluronic L-61 (polyethylene oxide-polypropylene oxide adduct, molecular weight 1000). This wettable powder is designated hereinafter as Formulation A.

Formulation A was diluted with water to give the final concentrations set forth in Table 1 and tested against Panagrellus spp. and Rhabditis spp. The results are recorded as percent kill at the indicated dosages in parts per million of active ingredient after a 4 day incubation period. A 10% kill is merely the same amount of kill as occurs with a blank sample.

TABLE 1

| Intermediate | CP-Code | Derivative | Code | Nematocidal Activity (NESA) | | |
|---|---|---|---|---|---|---|
| | | | | 400 | 200 | 25 |
| Me\O\P/\CCl₂=CHS/ \Cl | CP 14 | —NHiPro | 7587 | 100 | 100 | 30 |
| | CP 14 | —SEt | 7588 | 100 | 100 | 30 |
| Me\S\P/\CCl₂=CHS/ \Cl | CP 15 | —NHiPro | 7589 | 10 | 10 | 10 |
| | CP 15 | —SEt | 7590 | 100 | 100 | 30 |

Formulation A was added to soil heavily infested with Meloidogyne spp. Then tomato plants were transplanted into the soil and allowed to grow. The root knots which formed on the roots of the plants were then measured according to a root knot index based on a 0–10 scale where 10 indicates complete absence of visible knotting and 0 indicates all roots were heavily infested (knotted). Tomato plants transplanted to the infested soil which did not contain the nematocide had an average root knot index of 0 while tomato plants transplanted to soil which had been steamed to kill all nematodes had an average root knot index of 10. The results of the test are set forth in Table 2.

TABLE 2

| Intermediate Code | Derivative Code | Nematocidal Activity (NEPA) | |
|---|---|---|---|
| | | 200 | 20 |
| 14 | 7587 | | 0 |
| 14 | 7588 | 0 | 0 |
| 15 | 7589 | 10 | 10 |
| 15 | 7590 | | 10 |

Compound 7590 is unusual in having both good saprophytic and good parasitic nematocidal activity.

What is claimed is:

1. A compound having a formula selected from the group consisting of (a)

and (b)

where R₁ is trichloroethyl or dichlorovinyl and R₂ is lower alkyl or phenyl.

2. A compound according to claim 1 having formula a.
3. A compound according to claim 2 where R₁ is 2,2,2-trichloroethyl and R₂ is lower alkyl.
4. A compound according to claim 3 where R₂ is methyl.
5. A compound according to claim 3 wherein R₂ is ethyl.
6. A compound according to claim 2 where R₁ is 2,2-dichlorovinyl and R₂ is lower alkyl.
7. A compound according to claim 6 where R₂ is methyl.
8. A compound according to claim 6 where R₂ is ethyl.
9. A compound according to claim 2 wherein R₂ is phenyl.
10. A compound according to claim 9 wherein R₁ is 2,2,2-trichloroethyl.
11. A compound according to claim 9 wherein R₁ is 2,2-dichlorovinyl.
12. A compound according to claim 1 having Formula b.
13. A compound according to claim 12 where R₁ is 2,2,2-trichloroethyl and R₂ is lower alkyl.
14. A compound according to claim 13 where R₂ is methyl.
15. A compound according to claim 13 where R₂ is ethyl.
16. A compound according to claim 12 where R₁ is 2,2-dichlorovinyl and R₂ is lower alkyl.
17. A compound according to claim 16 where R₂ is methyl.
18. A compound according to claim 16 where R₂ is ethyl.
19. A method of making a compound according to claim 1 having Formula b comprising reacting a sulfenyl chloride of the formula R₁SCl with a phosphonyl dichloride of the formula

and reacting the intermediate thus formed with $H_2S$, moisture being excluded from the reactions.

20. A process according to claim 19 wherein the $H_2S$ reaction is carried out in a substantially anhydrous, inert organic solvent.

21. A process according to claim 20 wherein the solvent is carbon tetrachloride.

22. A process according to claim 19 wherein $R_1$ is 2,2-dichlorovinyl.

23. A process according to claim 19 wherein $R_1$ is 2,2,2-trichloroethyl.

References Cited

UNITED STATES PATENTS 2,815,361  12/1957  Morris et al. _____ 260—960

CHARLES B. PARKER, Primary Examiner
A. H. SUTTO, Assistant Examiner

U.S. Cl. X.R.

260—239, 293.4, 313.1, 959, 960, 972, 973, 984, 985; 424—219, 221